(12) United States Patent
Schmidt

(10) Patent No.: US 10,914,890 B1
(45) Date of Patent: Feb. 9, 2021

(54) HORTICULTURAL LUMINAIRE WITH A DOWNWARD BATWING LIGHT DISTRIBUTION

(71) Applicant: Jonathan Becker Schmidt, Round Rock, TX (US)

(72) Inventor: Jonathan Becker Schmidt, Round Rock, TX (US)

(73) Assignee: Fluence Bioengineering, Inc., Austin, TX (US)

( * ) Notice: Subject to any disclaimer, the term of this patent is extended or adjusted under 35 U.S.C. 154(b) by 0 days.

(21) Appl. No.: 16/589,153

(22) Filed: Oct. 1, 2019

Related U.S. Application Data

(63) Continuation of application No. 16/589,128, filed on Sep. 30, 2019.
(Continued)

(51) Int. Cl.
*F21V 8/00* (2006.01)
*A01G 7/04* (2006.01)

(52) U.S. Cl.
CPC .......... *G02B 6/0091* (2013.01); *A01G 7/045* (2013.01)

(58) Field of Classification Search
CPC ...... Y10S 362/805; A01G 7/045; A01G 9/249
(Continued)

(56) References Cited

U.S. PATENT DOCUMENTS 5,816,844 A 10/1998 Perera
7,588,359 B2 9/2009 Coushaine et al.
(Continued)

FOREIGN PATENT DOCUMENTS

GB 1198797 7/1970
WO 2010109395 A1 9/2010
(Continued)

OTHER PUBLICATIONS

Product Note to L-Series "BrightGuide-Flex Light Guide Plates", Brightview Technologies (ed. PNLF-US-001 Rev. C), undated but published at least as early as May 10, 2019 and prior to Applicant's priority filing date Aug. 30, 2019, downloadable from www.brightviewtechnologies.com (7 pp., color).
(Continued)

*Primary Examiner* — William J Carter
(74) *Attorney, Agent, or Firm* — Edward S. Podszus

(57) ABSTRACT

Systems and methods for an intracanopy horticultural lighting fixture. In aspects, a horticultural luminaire has an edgelit lightguide or optical conduit extending from a housing with its major dimension extending along longitudinal axis L, and one or more endcaps coupled to respective lateral edges, endcaps being convex curved about one or more axes transverse the longitudinal axis to prevent catch points. The endcap can be coupled to the housing to hinder separation of the lightguide. In another aspect a horticultural luminaire has an edgelit lightguide generating an output having downwardly directed peaks at about +/−30 degrees from vertical. Light output is preferably batwing shaped and symmetric. Another aspect provides a method for intracanopy lighting having an entirely planar optical conduit, a major extent of the optical conduit disposed along its longitudinal axis (L), and supporting the optical conduit, preferably its entirety, below an upper plant canopy.

22 Claims, 23 Drawing Sheets

Related U.S. Application Data

(60) Provisional application No. 62/894,670, filed on Aug. 30, 2019.

(58) Field of Classification Search
USPC ..................................... 362/563, 564, 805
See application file for complete search history.

(56) References Cited

U.S. PATENT DOCUMENTS

| | | |
|---|---|---|
| 7,618,171 B2 | 11/2009 | Tessnow et al. |
| 7,834,548 B2 | 11/2010 | Jousse et al. |
| D728,153 S | 4/2015 | Blessitt |
| 9,110,209 B2 | 8/2015 | Blessitt et al. |
| 9,512,984 B2 | 12/2016 | Tessnow et al. |
| 9,589,487 B1 | 3/2017 | Kasler et al. |
| 9,664,339 B2 | 5/2017 | Bittinger et al. |
| 9,857,520 B2 | 1/2018 | Parker et al. |
| 9,946,012 B2 | 4/2018 | Blessitt et al. |
| 10,072,816 B2 | 9/2018 | Shen et al. |
| 10,119,676 B2 | 11/2018 | Schiccheri et al. |
| 10,172,295 B2 | 1/2019 | Krijn et al. |
| 10,314,243 B2 | 6/2019 | Speer |
| 2017/0009944 A1 | 1/2017 | Wheatley et al. |
| 2017/0051877 A1 | 2/2017 | Weijers et al. |
| 2019/0049094 A1 | 2/2019 | Patterson et al. |
| 2019/0124854 A1 | 5/2019 | York et al. |

FOREIGN PATENT DOCUMENTS

| | | | |
|---|---|---|---|
| WO | 2015187448 A1 | 12/2015 | |
| WO | WO-2017185047 A1 * | 10/2017 | ............. A01G 7/045 |

OTHER PUBLICATIONS

Product Technical Specification of "Underpass" LED Grow Light luminaire, marketed by Lifted LED company, published at least as early as Apr. 3, 2019, downloadable from www.liftedled.com (1 pg., color).

Application Brief I-003, "Light Guide Techniques Using LED Lamps", Agilent Technologies, pub. Dec. 7, 2001 (22 pp).

* cited by examiner

HORTICULTURAL LUMINAIRE WITH A DOWNWARD BATWING LIGHT DISTRIBUTION

CROSS REFERENCE TO RELATED APPLICATIONS

This application claims priority to U.S. provisional application Ser. 62/894,670, whose contents are incorporated by reference as if fully set forth herein.

STATEMENT REGARDING FEDERALLY SPONSORED RESEARCH OR DEVELOPMENT

N/A

FIELD OF THE DISCLOSURE

Examples of the present disclosure are related to systems and methods for horticultural lighting fixtures. More particularly, embodiments disclose lighting fixtures configured to be positioned in the intracanopy space using a lightguide.

BACKGROUND

Controlled environment agriculture, especially vertical farming is becoming more prevalent in the US and around the world. Vertical farming relies on light fixtures to illuminate a plant canopy or intracanopy space. The plant canopy refers to the upper portion or top of the plant, and an intracanopy refers to the lower portion of a plant below the top or plant canopy. Sunlight or artificial light emitted from above the canopy is often blocked by the plant canopy from reaching the majority of the plant located in the intracanopy space. The intracanopy space is especially useful to illuminate in vine crops such as tomatoes, cucumbers, or peppers. The light fixtures uniformly distribute radiant flux over the plant canopy, while removing heat from light sources (typically LEDs). The light fixtures' efficacy and cost directly impacts the operational expenses associated with vertical farming. As fixture height directly influences a number of vertical layers within a growth volume, it is useful to minimize a form factor or vertical height of the fixture.

Many known point sources of light such as light-emitting diodes (LEDs) can be used in indoor or greenhouse agriculture, but the point-source approach may have a harmful intensity to foliage, can be blocked by nearby leaves blocking adjacent single points of light, and can be a source of uncomfortable glare to greenhouse workers.

In U.S. Pat. No. 10,314,243 (Speer), assigned to Applicant's assignee's parent company, Osram Sylvania Inc. and so ultimately under common ownership with the present application, there is disclosed at FIGS. 4 and 6 therein a light module positioned above the plant canopy emitting light into an optical conduit extending from above the canopy to below the canopy.

There are known light sources, such as fixtures, luminaires or lamps, disclosed in the literature, e.g. US patent Pubs. US2019/0049094 (Patterson); US2019/0124854 (York); and U.S. Pat. No. 10,172,295 (Krijn); U.S. Pat. No. 9,857,520 (Parker); U.S. Pat. No. 9,110,209 (Blessitt); U.S. Pat. No. 9,946,012 (Blessitt); U.S. Pat. No. 9,589,487 (Kasler); U.S. Pat. No. 9,664,339 (Bittinger); U.S. Pat. No. 9,512,984 (Tessnow); U.S. Pat. No. 10,119,676 (Schiccheri); and in patent Pubs. US2017/0009944(Wheatley); US2017/0051877 (Weijers); and in PCT International applications WO2015/187448 (Stormberg) and WO2010/109395 (Tanase). An exemplary Optical Lighting Film (OLF) is disclosed in U.S. Pat. No. 10,072,816 (Shen) assigned to Bright View Technologies Corp.

SUMMARY OF DISCLOSED EMBODIMENTS

Some embodiments disclosed herein utilize an edgelit lightguide.

In some embodiments, an intra-canopy horticultural luminaire for illuminating a portion of a crop having a vertical height that is measurable along an axis that is substantially vertical to ground level comprises a solid-state light source disposed on a substrate and located within a housing; a lightguide having a first longitudinal edge and a second longitudinal edge positioned opposite the first longitudinal edge; the lightguide having a longitudinal axis (L) extending along its major length dimension, the lightguide further having a width (W) in a lateral direction along a width axis (X) perpendicular to the longitudinal axis (L); the lightguide defining at least one emission face extending between the first and second longitudinal edges; the lightguide being optically coupled to the light source at the first longitudinal edge, the lightguide receiving light emitted from the light source and transmitting that light therethrough by total internal reflectance to the at least one emission face; the lightguide further having opposed first and second lateral peripheral edges at opposite ends of the longitudinal axis; and at least one endcap coupled to at least one lateral peripheral edge of the lightguide, the at least one endcap being outwardly-convex curved about an axis transverse to the longitudinal axis.

In other aspects, an intra-canopy horticultural luminaire for illuminating a portion of a crop having a vertical height that is measurable along an axis that is substantially vertical to ground level comprises a solid-state light source disposed on a substrate and located within a housing; a lightguide having a first longitudinal edge and a second longitudinal edge opposite the first longitudinal edge; the lightguide having a longitudinal axis (L) extending along its major length dimension, the lightguide further having a width (W) in a lateral direction along a width axis (X) perpendicular to the longitudinal axis (L); the lightguide defining at least one emission face extending between the first and second longitudinal edges, the at least one emission face extending away from the light source; the lightguide being optically coupled to the light source at the first longitudinal edge, the lightguide receiving a portion of the light emitted from the light source and transmitting that light therethrough, the lightguide altering an angular path of the transmitted light along a forward direction (V); wherein the lightguide has a light output that includes the transmitted light from the light source; wherein the light output of the lightguide has two downwardly directed angular peaks on opposite sides of the vertical direction (V), has a value below the peak values along the vertical direction (V), and has decreasing values at angles above the angular peaks; and wherein the angular peaks are at about plus 30 degrees and at about minus 30 degrees away from the vertical direction (V).

In another aspect, a method of providing intracanopy horticultural lighting in a horticultural environment, the horticulture environment comprising a crop having a vertical height that is measurable along an axis (V) that is substantially vertical to ground level, comprises providing a light module assembly comprising a plurality of solid-state light sources and an optical conduit having a vertical axis; a major extent of the optical conduit being disposed along its longitudinal axis (L); the optical conduit having a light input surface along an edge extending substantially parallel the longitudinal axis (L), the light input surface facing the light sources in light-receiving relation; the optical conduit being entirely planar, from a proximal location proximate the light sources to a free distal location remote from the light sources, along two parallel planes parallel the vertical axis; the optical conduit further defining at least one planar light emission face extending parallel to the longitudinal axis; supporting the optical conduit at a vertical location below an upper canopy of the crop; guiding light generated by the one or more light sources downward along the vertical axis of the optical conduit towards an intra-canopy space of one or more plants; and outputting the light from the optical conduit into the intra-canopy space, wherein the light is outputted in a direction that is transverse to the vertical axis.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION OF PREFERRED EMBODIMENTS

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Vined plants are typically strung from rafters in the ceiling of greenhouses. These vine crops (e.g., tomato, cucumber, peppers) are usually strung upwards along guidewires as high as 15-20 feet (4.6 m-6 m); half of the vines from a given plant are strung upwards and to the left, the other half strung upwards and to the right, to form a narrow "V" profile when looking down a row of plants. This interstitial space between the legs of this "V" is where an intra-canopy luminaire can be advantageously deployed. Sunlight and toplight are generally effective at illuminating the top few feet (to circa 1 m) of these rows, but illumination can be disadvantageously diminished by as much as 90% further down the vine because of foliage density. Present embodiments herein are believed to advantageously illuminate this darker yet photosynthetically active region of the plant. Depending on light intensity, it is believed that an intracanopy luminaire product can increase yield (harvested tonnage), and further believed that such a product could potentially increase yield up to 30%.

All plants have a photosynthetic rate that increases with increasing irradiance, but at a certain level of irradiation, they encounter a "saturation point" beyond which further increasing irradiance provides no photosynthetic benefit or, in some cases, harms the plant by a process known as photobleaching. A lower exitance would allow for the same photonic flux to be spread across a broader surface of the leaf, lowering the saturation point. Applicant herein perceived that a luminaire employing a lightguide can decrease the photonic exitance, or photonic flux per unit area, by increasing the surface area of emission. Using a lightguide emits a much larger diffuse lit area when compared to a luminaire that would use a point-source style approach. This minimizes the potential of nearby leaves/foliage blocking single points of light and offers more widespread, deeper penetrating light patterns that will interact with a greater percentage of the foliage. Present embodiments employ a thin panel lightguide that supplies photosynthetic photon flux (PPF) efficiently to the intracanopy space.

Figure 6:
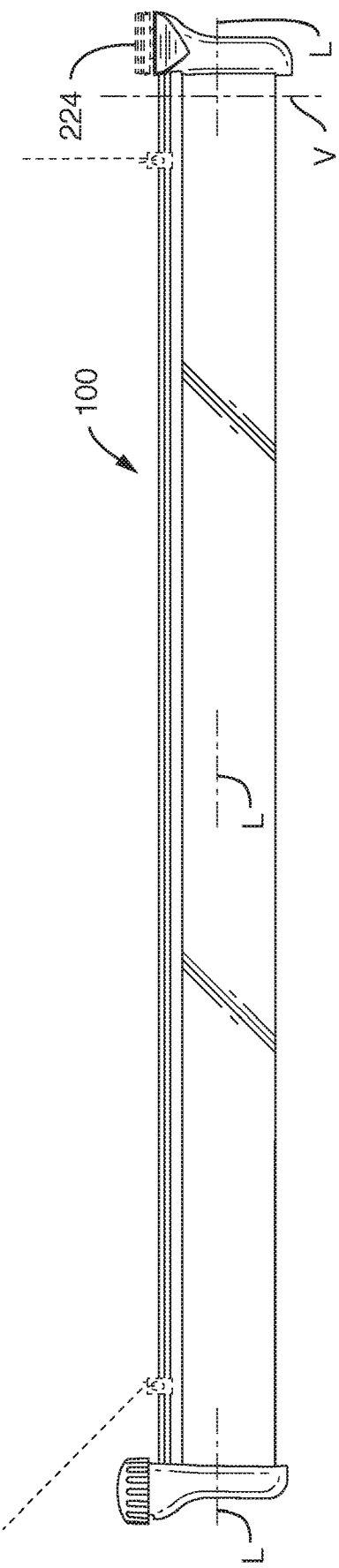
FIG. 6 is a front elevational view of luminaire 100.
Figure 7:
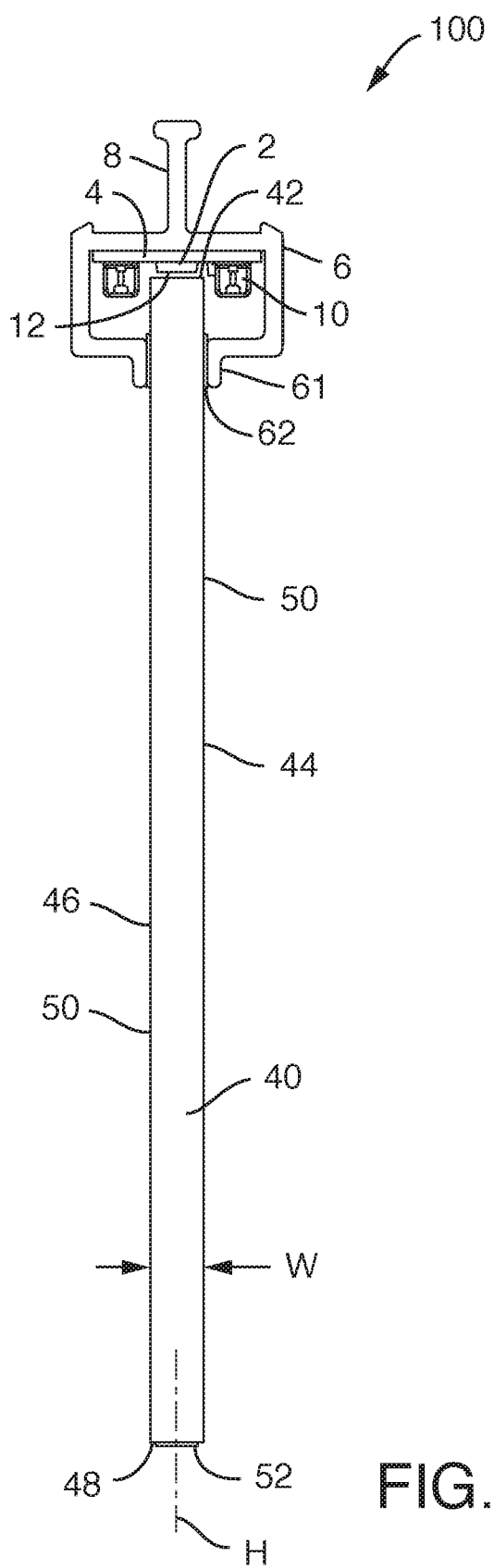
FIG. 7 is a lateral end view of luminaire 100, with endcap 214 removed.
Figure 22:
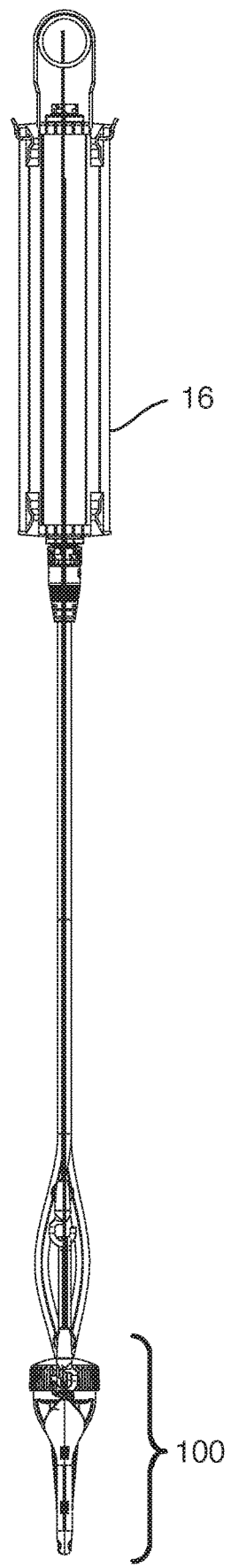
FIG. 22 shows luminaire 100 connected to power supply 16.
Figure 23:
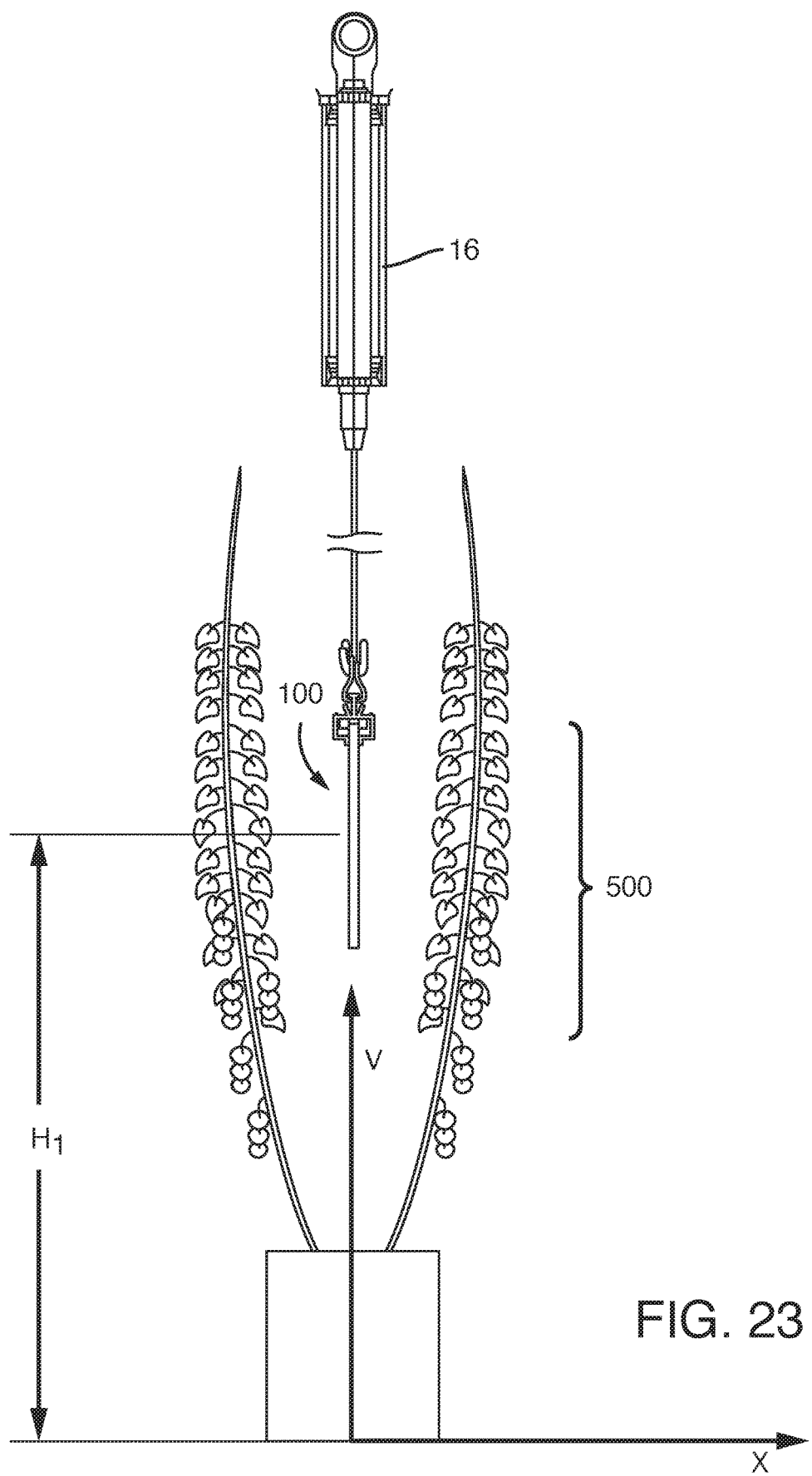
FIG. 23 shows luminaire 100 suspended in intracanopy space 500.

FIG. 6 depicts a lighting system 100, according to an embodiment. Lighting system 100 may also be referred to as luminaire or horticultural luminaire 100. The luminaire 100 or light module assembly is understood as a matter of nomenclature to exclude external electrical components such the power supply or cables, especially when discussing positioning of the luminaire 100 relative to the intracanopy space 500 as shown in FIG. 23, since placement of the power supply 16 (see FIG. 22-24) is not relevant thereto. Embodiments of the luminaire are shown for example in FIGS. 1-8. Referring to FIG. 7, an end view of luminaire 100 is shown, with optional endcaps 214 not attached. Luminaire 100 may also be referred to as a light module assembly. A solid-state light source 2 is provided, such as light-emitting diodes (LEDs) or laser diodes, advantageously LEDs. Light source 2 is carried on a substrate 4 and supplied by traces (not shown) in conventional manner with electric power. Substrate 4 can be a printed circuit board (PCB) such as a metal core PCB (MCPCB), which favorably acts as a heat sink to take thermal energy away from LEDs 2 in operation. Collectively, LEDs 2 and PCB 4 form light engine 14, shown schematically in FIG. 4. Two poke-home connectors 10 are disposed on PCB 4 to provide for connection to a positive voltage and negative or ground connection. The LEDs 2 and PCB 4 are disposed in housing 6. Housing 6 is preferably formed of a thermally conductive material, and may be conveniently made of extruded aluminum. Housing 6 acts as a heat sink, and can be further cooled with optional fins or ribs 8. LEDs 2 and PCB 4 are preferably in thermal communication with housing 6, which thermal coupling may advantageously be increased, as is known in the art, with thermal grease, thermal adhesive, or thermal interface tape on an inner surface of housing 6 and the underside of substrate 4. Housing 6 defines a channel having an inner space to accommodate light source 2 and lightguide 40.

Light source 2 may be an artificial light source and is configured to stimulate plant growth by emitting light. For example, light source 2 may be a plurality of LEDs. Light source 2 may be utilized to create light or supplement natural light to the area of interest. Light source 2 may provide a light spectrum that is similar to the sun, or provide a spectrum that is tailored to the needs of particular plants being cultivated. Light source 2 may be positioned in a linear array, e.g. a 1×n array, on substrate 4. Each LED 2 typically has a square emission face 12, and emits light into an angular distribution that is centered around a central axis. These central axes are parallel to each other and are generally parallel to the vertical or height axis (H) of lightguide 40. The angular distribution is typically Lambertian, with an intensity that peaks along the central emission axis, and falls to zero at ninety degrees from the central axis.

Figure 8:
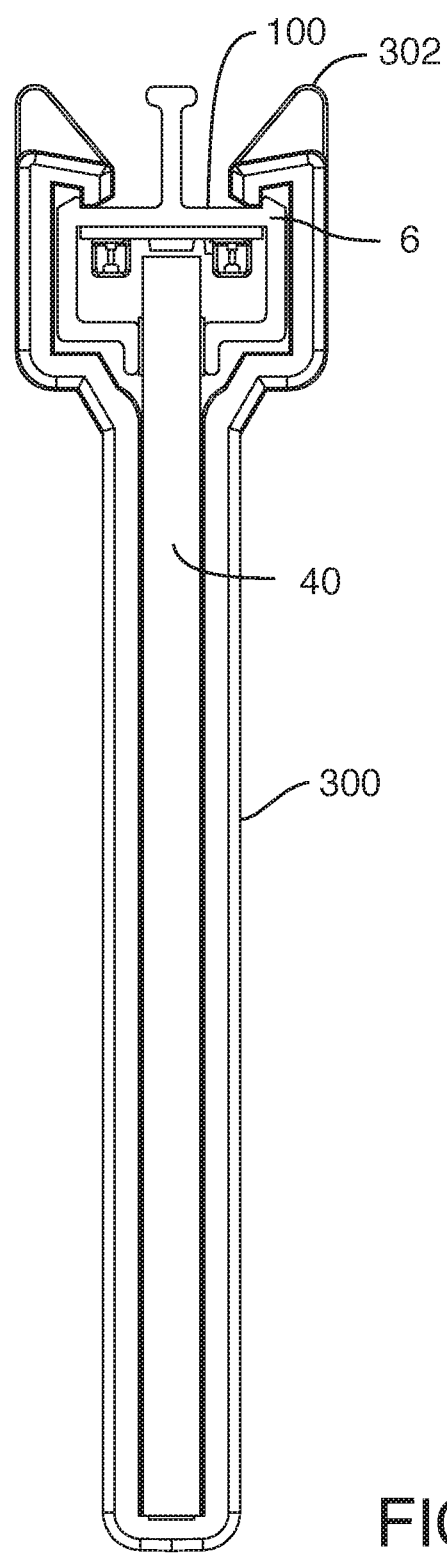
FIG. 8 is a view similar to FIG. 7 and depicting midspan clip 300.

Referring to FIGS. 7-8, for convenient visualization they are shown to approximate scale at about twice actual size. Lightguide 40 has opposed major emission surfaces 44, 46 between which light propagates by total internal reflectance (TIR), and the light is refracted out equally to the left and right principally through the two planar emission surfaces 44, 46. Lightguide 40 may also be referred to as an optical conduit. Lightguide 40 is made of acrylic also known as PMMA (Polymethyl methacrylate). Lightguide made be made from polycarbonate, glass or other appropriate material that transmits light by total internal reflectance (T.I.R.). An optical plastics material is preferred for durability, low cost, and low weight. Lightguide 40 has a first longitudinal edge 42 disposed at an upper region proximal light source 2 and a second longitudinal edge 48 disposed remote from light source 2 at a distal or lower region. Lower longitudinal edge 48 can be referred to as a distal free end, and is not intended for light emission.

Light is introduced from LEDs 2 into first longitudinal edge 42 of lightguide 40. The first edge 42 can be referred to as a light input surface. Thus, lightguide 40 is edgelit. Referring to FIG. 7, it is noted there is an intentional gap between light emission face 12 of light source LED 2 and input edge 42. It has been observed that there is a slight efficiency increase in maintaining a 0.1 mm to 0.25 mm gap. This gap is maintained by "dummy" capacitors or other surface mount technology (SMT) components mounted to PCB 4 as a datum that are about 0.1 mm taller than LED 2 itself.

Use of lightguide 40 mixes output of discrete light sources of LEDs 2 into a more homogenous emission plane. This permits use of LEDs of different intensities and spectra and permits lightguide 40 to blend the source light into a more congruent output. Use of lightguide 40 is more aesthetically pleasing and reduces an optical eye-health safety risk to greenhouse workers as compared to conventional point source LEDs that present a harsh glare.

Lightguide 40 can be referred to as a thin panel. It is preferred to have a single lightguide 40. Lightguide 40 is planar over at least one, preferably both, exposed emission surfaces 44, 46 that extend out of housing 6 and represent the active light emission surfaces. Lightguide 40 is a rectangular body that advantageously is a single, uninterrupted, planar surface. Lightguide 40 may be referred to as having a shape of a rectangular parallelepiped. Conveniently, lightguide 40 may be cut from rectangular acrylic sheet stock. The relevant optical portions of the lightguide 40 are all integrally formed in one lightguide. Lightguide 40 is advantageously rigid. Lightguide 40 extends from housing 6 about 3 inches (75 mm) in height along lightguide vertical axis, and has a thickness of about 3 mm. Preferably lightguide 40 has a vertical height between about 1.5 inch (38 mm) to about 7 inches (178 mm).

Advantageously, since lightguide 40 is a single uninterrupted planar surface extending from housing 6, it is easy to clean of fertilizers, contaminants, dirt or debris. The smooth exposed surfaces of lightguide 40 thus inhibit any "catch points" where plants or vines might otherwise grow into or catch onto.

Figure 4:
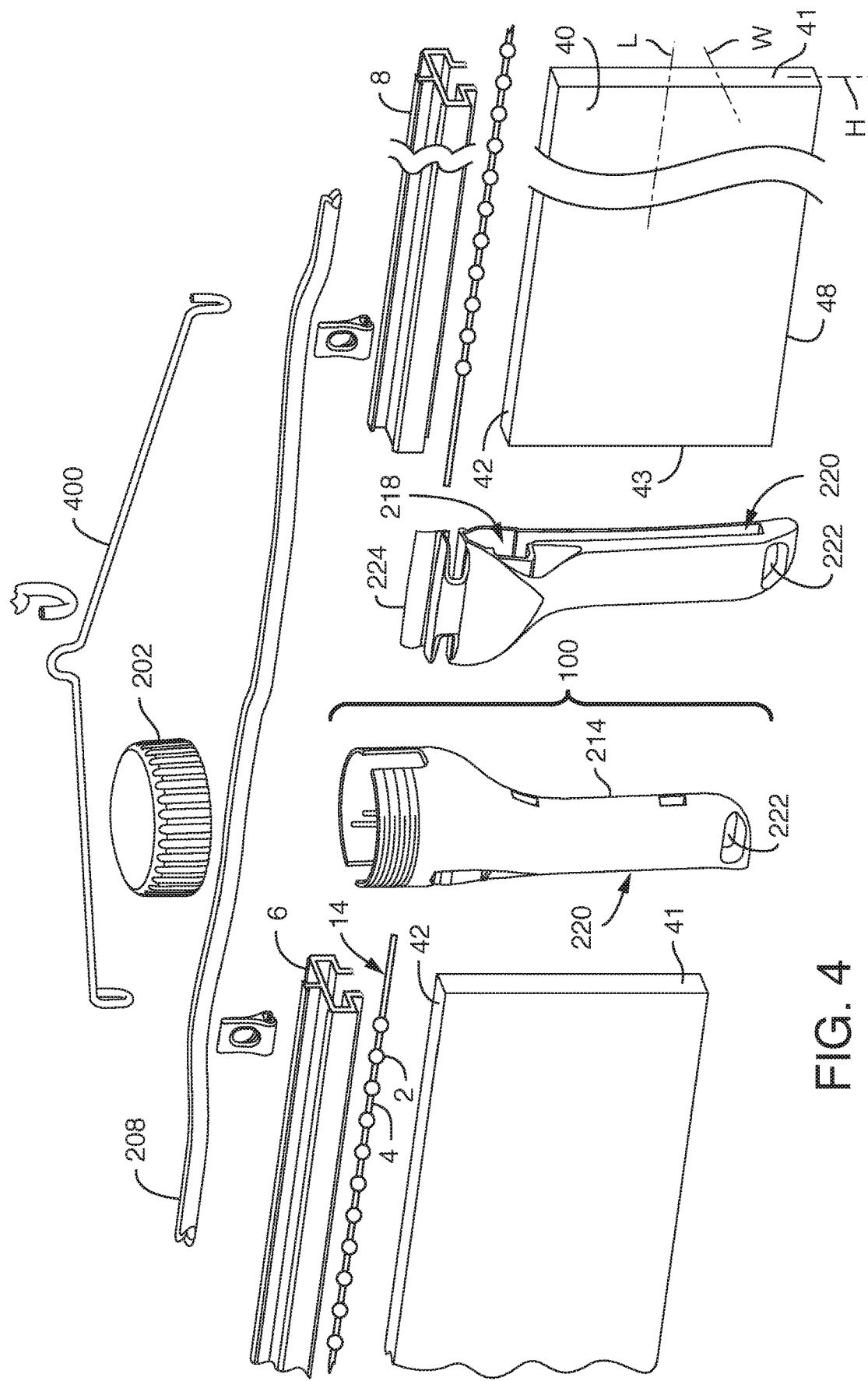
FIG. 4 is an exploded perspective view of luminaire 100.
Figure 5:
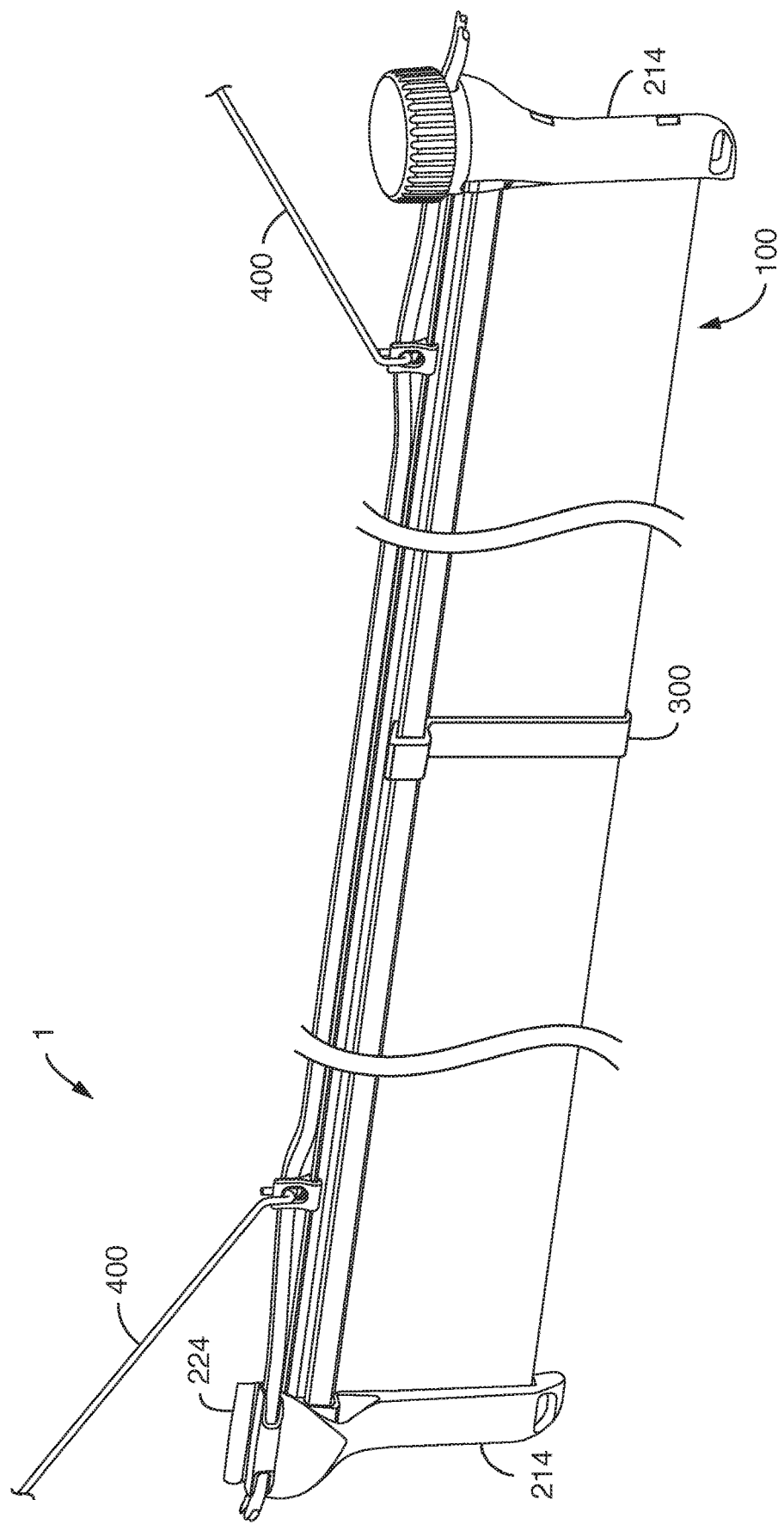
FIG. 5 is a perspective view of luminaire 100 showing endcaps 214 and intermediate clip 300.

Referring to FIGS. 4 and 7, housing 6 has at least one supporting lip 61, preferably a pair of opposed supporting lips 61, to receive and hold lightguide 40. The channel of housing 6, in particular at a location of supporting lip or lips 61, can be formed to fit snugly to major surfaces 44, 46 to retain lightguide 40. In some embodiments, a reflective tape 62 is attached at an inner surface of housing 6 where housing 6 contacts lightguide 40 to reflect some unused light back into lightguide 40. Also advantageously, lightguide 40 is provided with reflective tape 52 at lower distal longitudinal edge 48 to reduce light losses and promote refraction through principal emission surfaces 44, 46.

Lightguide 40 can advantageously be formed from a conventional lightguide material sold under the trade designation BrightGuide-Flex light guide plate, model L-F05A and marketed commercially in the United States by Bright-View Technologies. This light plate material has a prismatic microstructure and can comprise a film adhered to a planar transparent plastics material referred to as a plate, the plate being available in 3 mm, 4 mm and 6 mm thicknesses, and is marketed for use in constructing general room lighting for homogenous illumination of room spaces. The L-F05 light plate is marketed for use with at least two opposing LED light sources that inject light inward from opposing edges of the material. The L-F05A plates are marketed to be used oriented horizontal to a ceiling (or floor), with the useful light being reflected and directed out only the one side facing the floor of the room. It is understood, without wishing to be bound by theory, that in normal use of the L-F05A material, the principle of superposition of the two interfering light distribution patterns results in a desired, generally homogenous light distribution, intended to avoid peaks of intensity, and so suitable for general room illumination. However, Applicant herein departed from the intended manner of use of the commercially available L-F05A material, and, orienting it vertically in a room space and inputting light from just one narrow light input edge, observed a useful, unexpected, and surprising result, namely a downward directed batwing light distribution resulted, which Applicant's skill further developed into present embodiments of luminaire 100 for intracanopy lighting. Applicant herein also determined that, contrary to potential expectations, a delamination of the light directing film on outer surfaces of the guide plate material was not observed despite the wet, hot or humid climate prevalent in a greenhouse.

Figure 24:
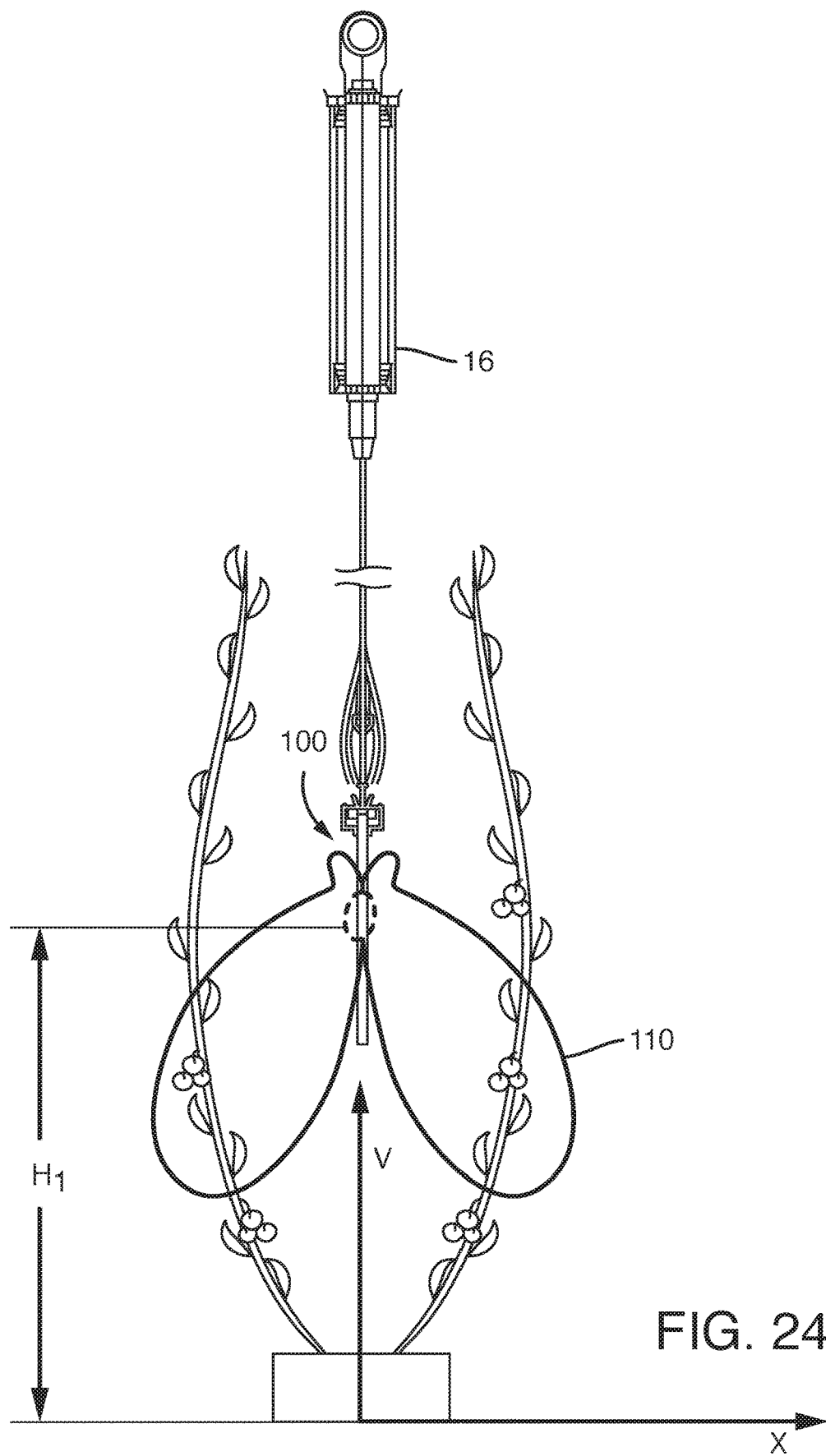
FIG. 24 schematically shows batwing distribution 110 in intacanopy space 500.

Applicant determined that a downward batwing distribution 110 from lightguide 40 allows luminaire 100 to be hung higher in the crop, further away from the more dense foliage near the intersection of the "V" shape of the vines, as aforementioned above; i.e., referring to FIGS. 23-24, thus at greater heights indicated H1 above the ground or base of the crop than would otherwise be the case. The downward batwing distribution is especially advantageous in early stages of crop growth. For example, it can permit installation of luminaire 100 before the vines are planted; this can make installation more convenient and cheaper for a grower, and give a grower about a one or two week head-start in the process. The downward batwing distribution allows the lights to be turned on earlier in the growth cycle, rather than waiting for the crops to grow up and around luminaire 100. The downward batwing distribution also allows light to impinge on upward-facing surfaces of foliage which are more receptive and/or responsive to light.

In alternate embodiments of lightguide 40, instead of a light directing film adhered to an outer surface of the lightguide, a molded lightguide could be cheaply manufactured with molded-in textures along major light emission faces 44, 46. This can allow for geometry changes near the input edge 42 of the free distal longitudinal edge 48. At distal edge 48 an inwardly-directed V-shape (pointing towards LEDs 2) can be molded (not shown), which is intended to refract any light that has made its way down the entire extent of lightguide 40 without being extracted by the textured emission surfaces 44, 46; this is in order to prevent light escaping directly downward which would be considered unused light. Referring to FIG. 7, in another embodiment, reflective tape 52 placed on edge 48 can redirect light back through lightguide 40 to increase the probability of useful extraction. Alternatively, another embodiment is a light guide with extraction features absent (not shown) for the section of lightguide 40 that is enclosed within heat sink housing 6, and over this region the lightguide would be polished to promote total internal reflection through this section to reduce light loss. Further alternatively, referring to FIG. 7, in another embodiment, reflective tape 62 is provided on inner surfaces of housing 6 that abut the lightguide.

Still further alternate embodiments of lightguide 40 can contain scattering particles therewithin that encourage out-coupling of light. Lightguide 40 can also contain phosphor particles for wavelength down-conversion of light from light source 2 and simultaneously as scatterers.

Figure 9:
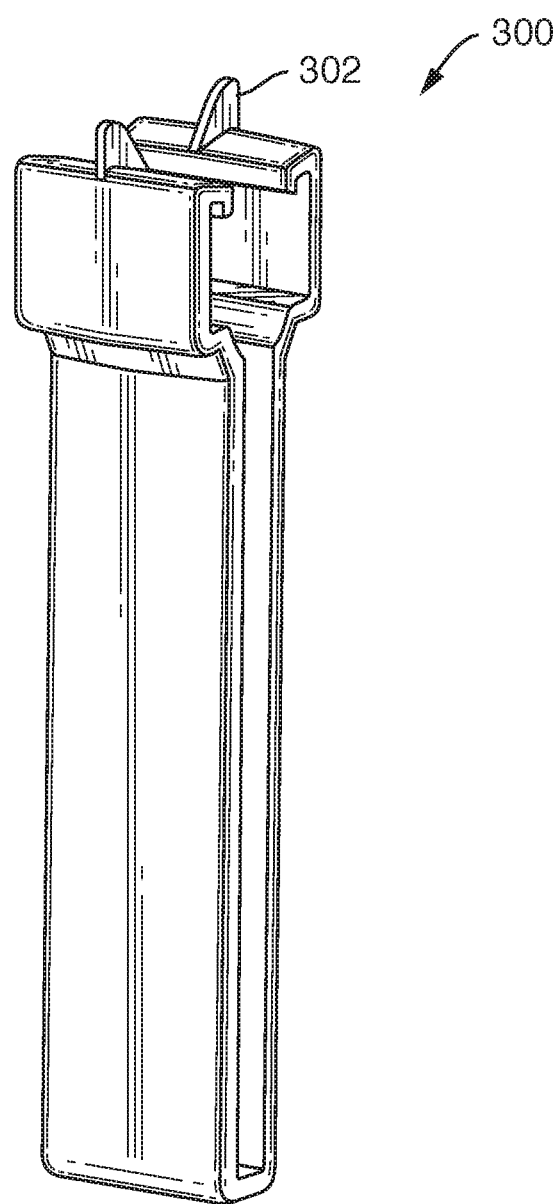
FIG. 9 is a perspective view of optional midspan clip 300.
Figure 10:
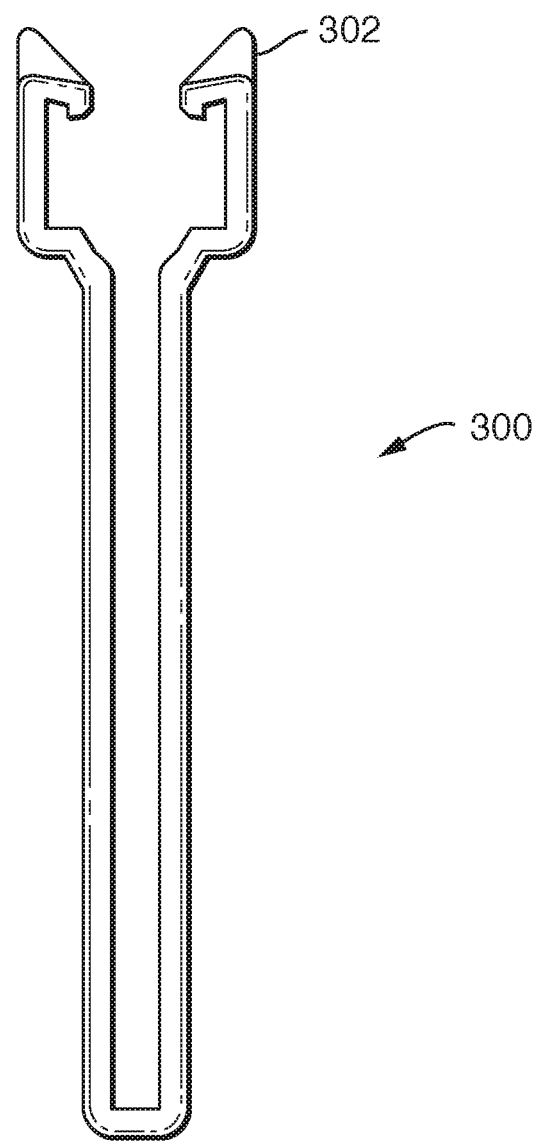
FIG. 10 is an end elevational view of midspan clip 300.
Figure 11:
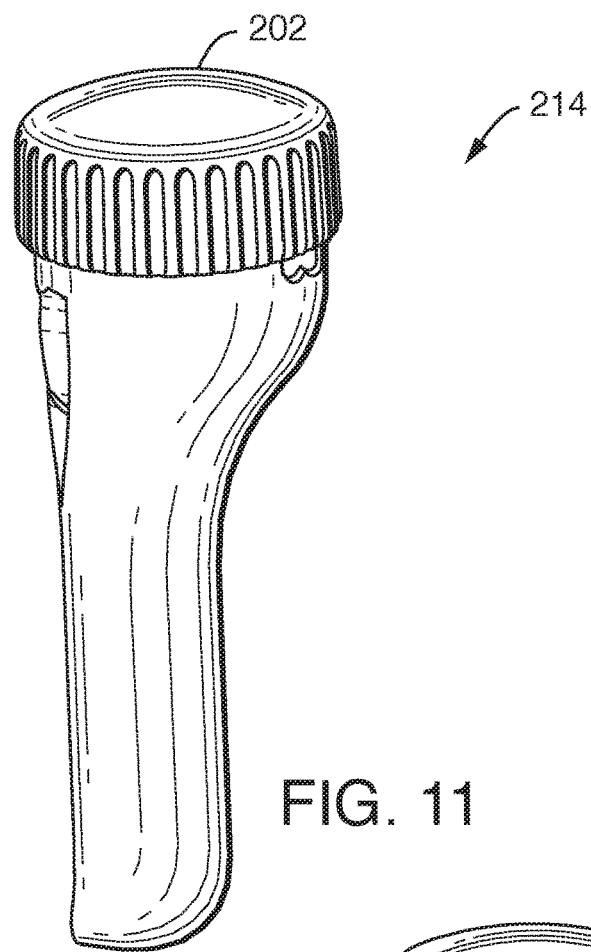
FIG. 11 is a perspective view of endcap 214 as seen from the top, rear, left side.
Figure 12:
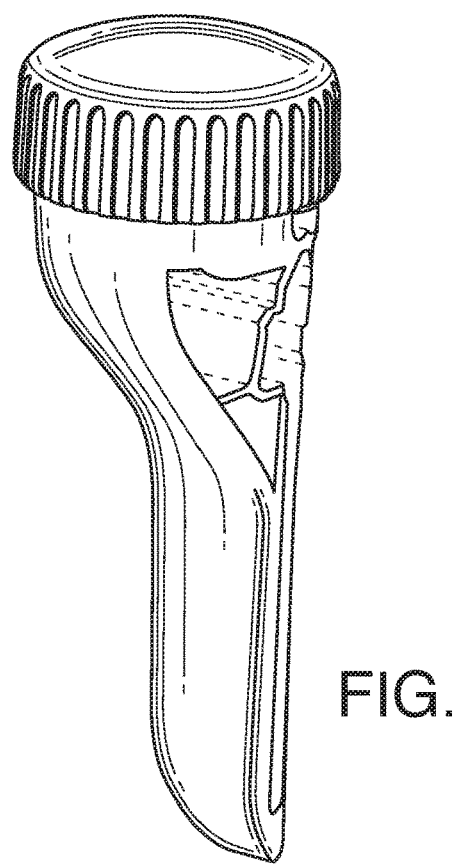
FIG. 12 is a perspective view of endcap 214 as seen from the top, front, right side.
Figure 13:
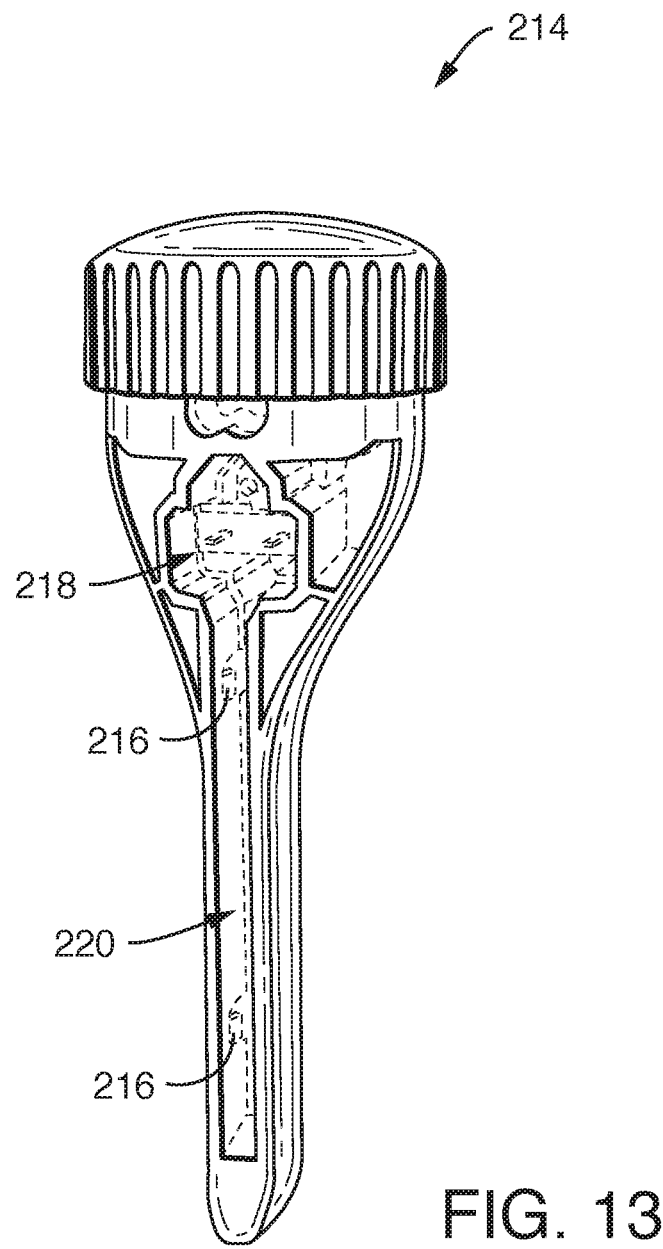
FIG. 13 is a perspective view of endcap 214 as seen from the front, left side.
Figure 14:
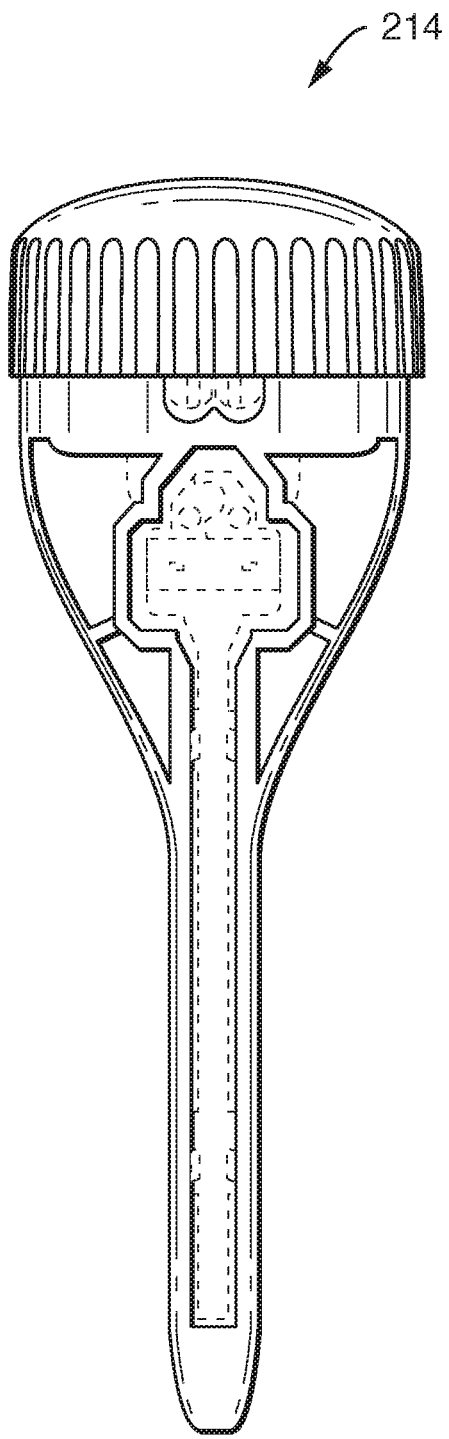
FIG. 14 is a front elevational view of endcap 214.

Referring to FIGS. 8-10, a midspan clip can be provided on luminaire 100 to assist in clamping lightguide 40 to housing 6. A luminaire 100 can have an overall length of 50 inch (1.25 m) and a lightguide 40 height of 3 inch (76 m); to avoid potential loosening due to an inherent weight of lightguide 40, a midspan clip 300 can be added intermediate the endcaps 214 at opposing lateral ends of lightguide 40. As shown, midspan clip 300 is shape conforming to housing 6 and lightguide 40 and clamps around an exterior surface and in particular behind an upper surface of housing 6. Midspan clip 300 is molded of resilient plastics material and has finger engaging tabs 302 to facilitate opening clip 300 to attach or detach it from housing 6.

Figure 20:
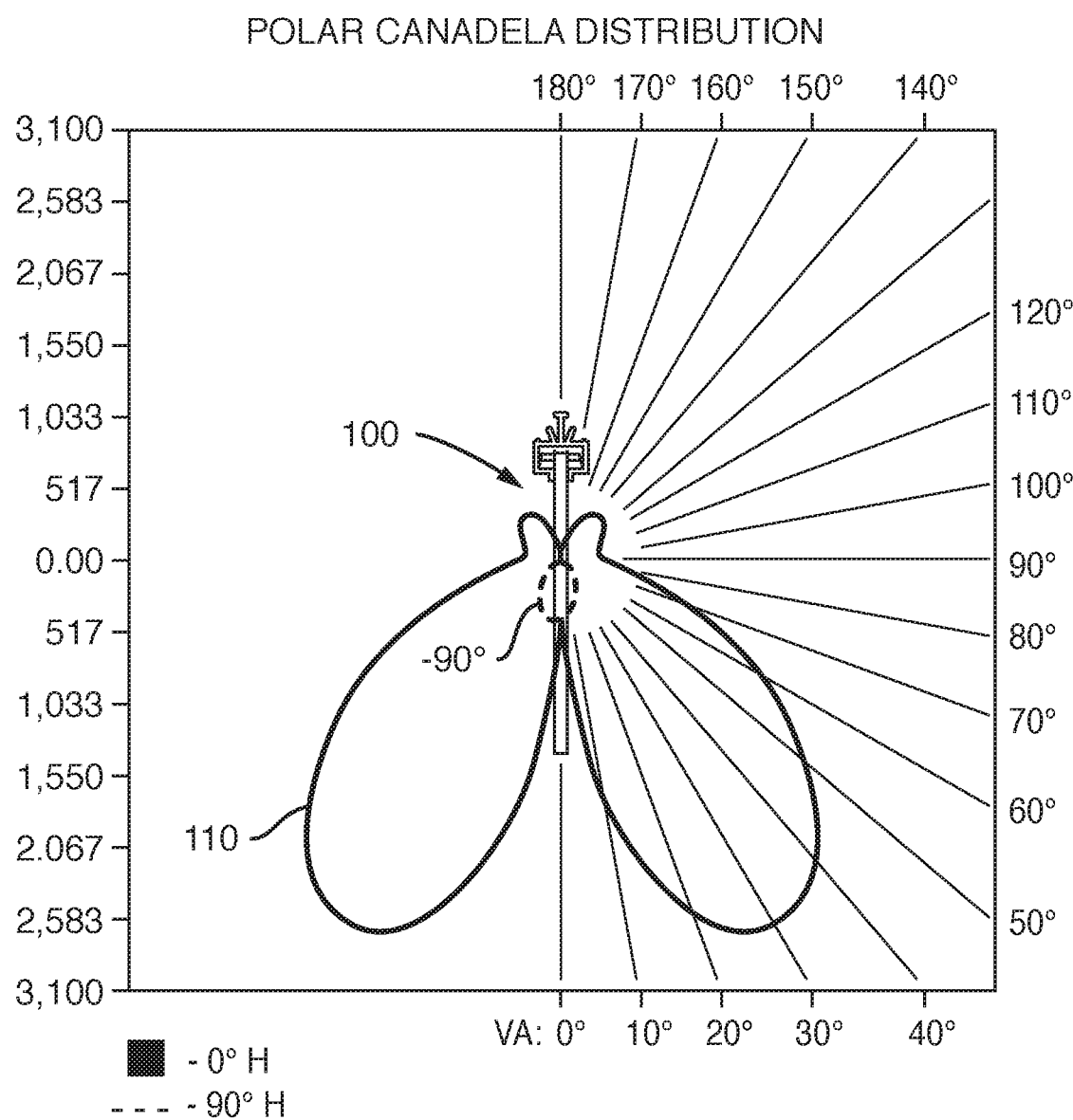
FIG. 20 is a plot in polar coordinates of batwing distribution 110.
Figure 21:
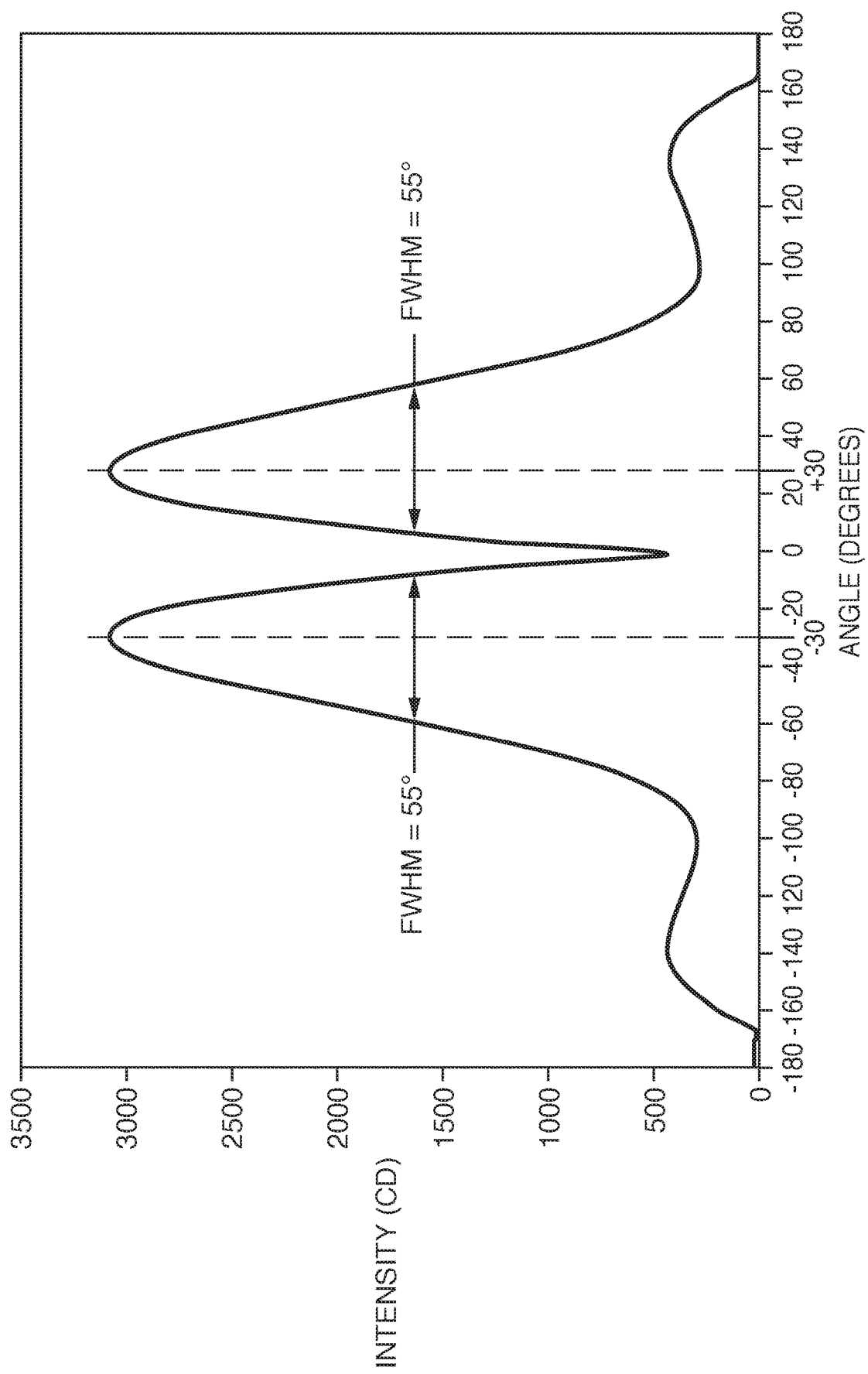
FIG. 21 shows batwing distribution 110 as a plot of intensity vs. angle.

Referring to FIGS. 20-21 luminaire can advantageously have downwardly directed batwing light distribution 110 which was seen to have two symmetric peaks at plus and minus 30 degrees from the vertical direction. A spectral scan was measured in increments of 5 degrees so it was observed to fall within 5 degrees of 30 degrees. The output light distribution is symmetric about its vertical axis which is the height direction of lightguide 40. Light emission from both opposing emission faces 44, 46 is symmetric and both sides of the output contain one well-defined, major peak at 30 degrees, with a full width half maximum (FWHM) of about 55 degrees. The valley between these peaks lies at nadir, with an intensity less than one-seventh (or about 14%) of the peak intensity. At values above the angular peaks the light output falls off monotonically. The small hump in intensity at higher angles away from the peak has no functional relevance, but is merely an artifact of having reflective tape 52 along bottom longitudinal edge 48. The light that strikes reflective tape 52 will be sent upward, back through lightguide 40, and is extracted at a similar angle as the downward light (at 30-40 degrees from vertical) except in the opposite direction. Referring further to polar plot in FIG. 20, there is negligible light emission along a horizontal (lateral) direction that is orthogonal to the desired vertical downward direction.

Referring to FIGS. 2-4 and 11-19, optionally luminaire 100 can have one or more endcaps 214. The endcap 214 can be constructed as an insulation-displacement connector (IDC) to readily pierce the insulation of an electrical cable that is easily laid into the slot adjacent electrical contacts and the top cap screwed down, according to the teachings of the present Applicant's commonly assigned, co-pending United States patent application entitled "Electrical Splice Connector" filed Jun. 3, 2019 as Ser. No. 16/429,414, the entire contents of which are incorporated by reference as if fully set forth herein. When so constructed, the top cap 202 is screwed down against power cable 208 to force it against blade contacts 212 which are electrically connected to electrical connectors 213 on endcap 214 that supply power to PCB 4 and LEDs 2 via poke-home connectors 10 shown in FIG. 7.

Endcap 214 does not influence the luminaire in an optical sense. The endcap snap fits to a lateral edge of lightguide 40 with sufficient vertical clearance for both the lateral edge of the lightguide and the aluminum channel 6 that it does not influence a spacing of the light input edge 42 to the light source 2. Advantageously the endcap 214 does not bias lightguide 40 towards the LEDs 2, so the dimensions do not have to be so tightly controlled as if the endcap 214 were a datum surface determining a spacing to the light source. Rather, a spacing of LED 2 to light input surface 42 of lightguide 40 is set by datum surfaces disposed on PCB 4.

Endcaps 214 provide curved surfaces that not only dress the lateral ends aesthetically, but protect the edges of lightguide 40 and prevent sharp corners. The endcaps having the cable clip 224 are so-called "dead" or "dummy" endcaps since they do not make an electrical connection. For convenience they are also labeled as endcap 214 since their mechanical function of protecting the lateral ends is similar, but they are not electrically "live". The cable clip 224 merely mechanically holds power supply cable 208 on its exterior surface as a wire management clip to avoid entanglement.

Endcaps 214 have smooth surfaces that are easy to clean of fertilizers, contaminants, dirt or debris. The smooth exposed surfaces of endcap 214 also inhibit any "catch points" where plants or vines might otherwise grow into or catch.

Figure 1:
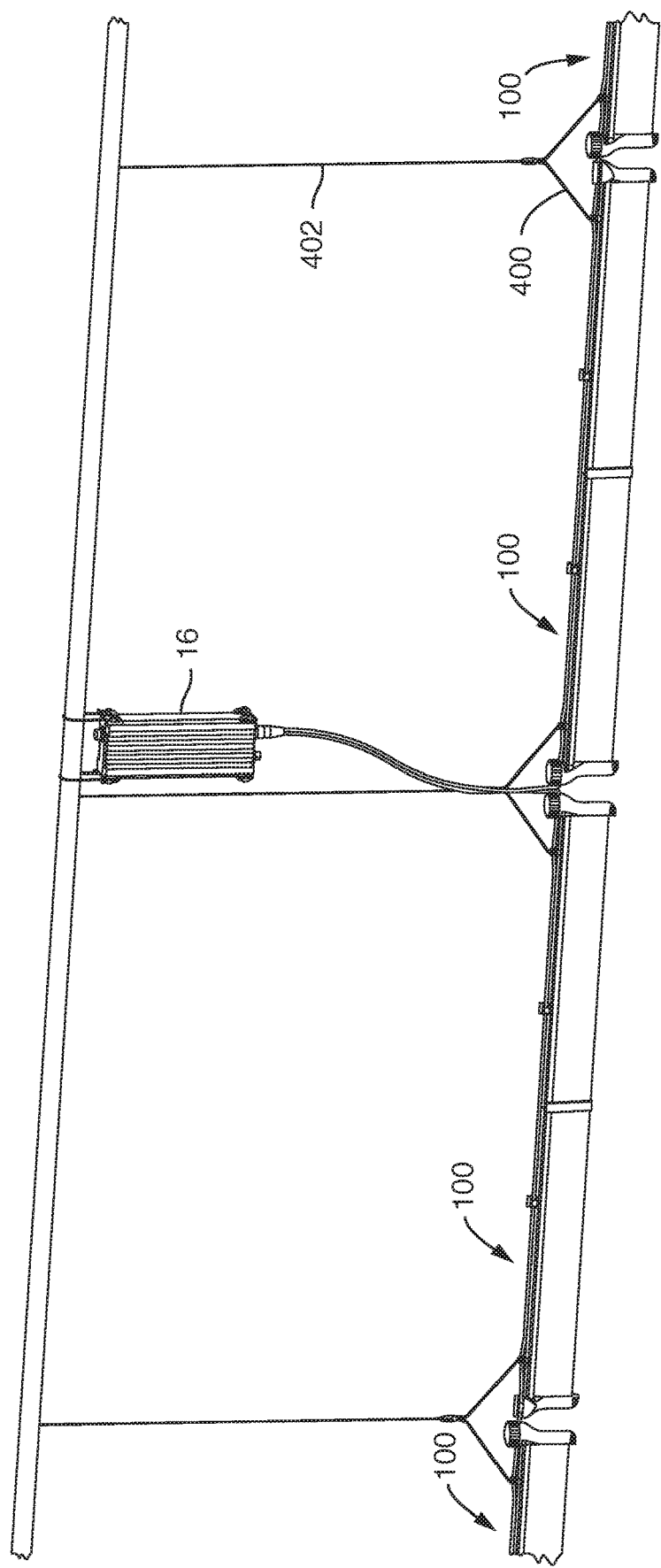
FIG. 1 shows three units of horticultural luminaire 100 in perspective view as deployed in a cable-suspended operational configuration.
Figure 2:
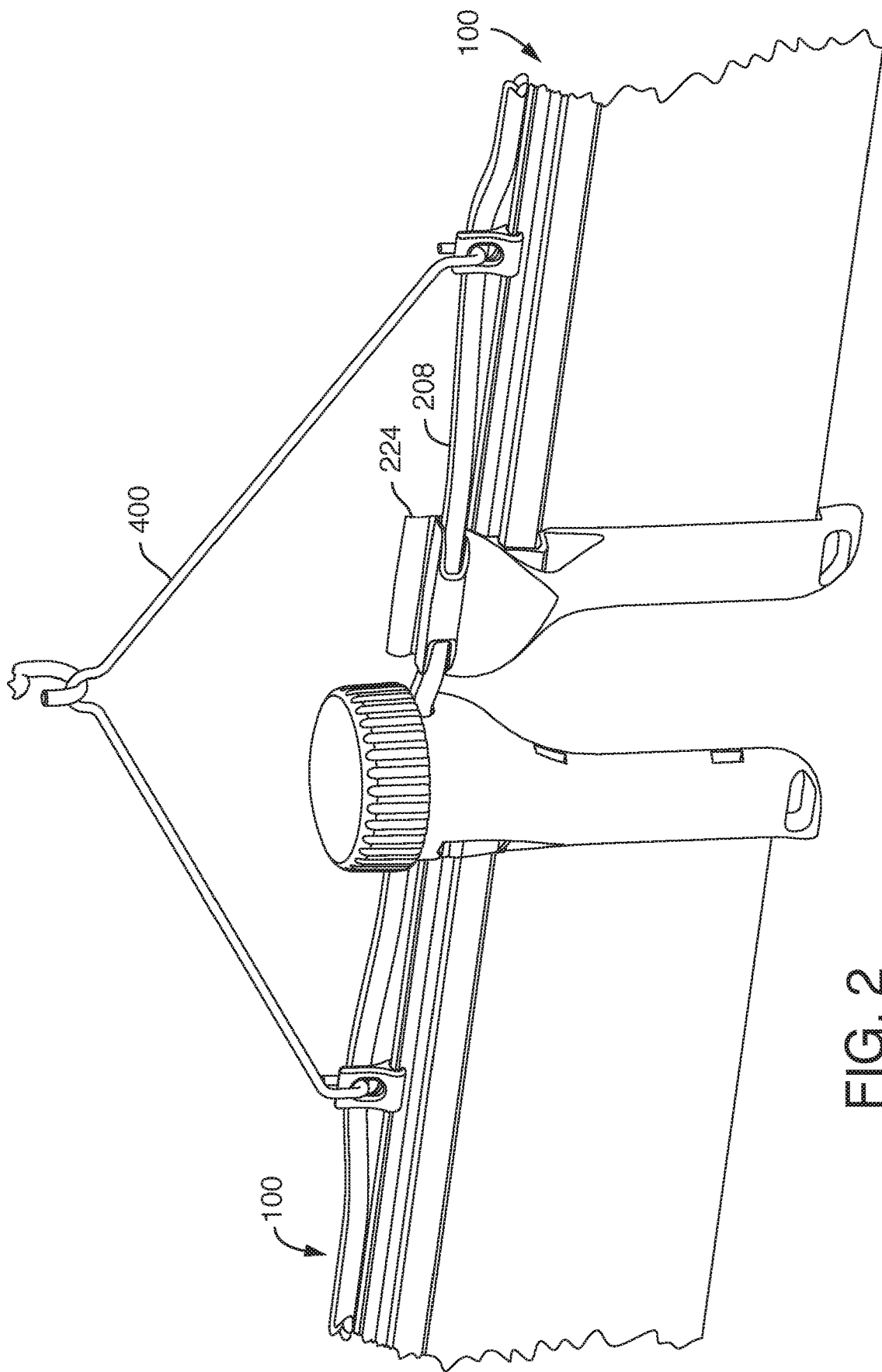
FIG. 2 is a partial fragmentary view of two luminaires 100.
Figure 3:
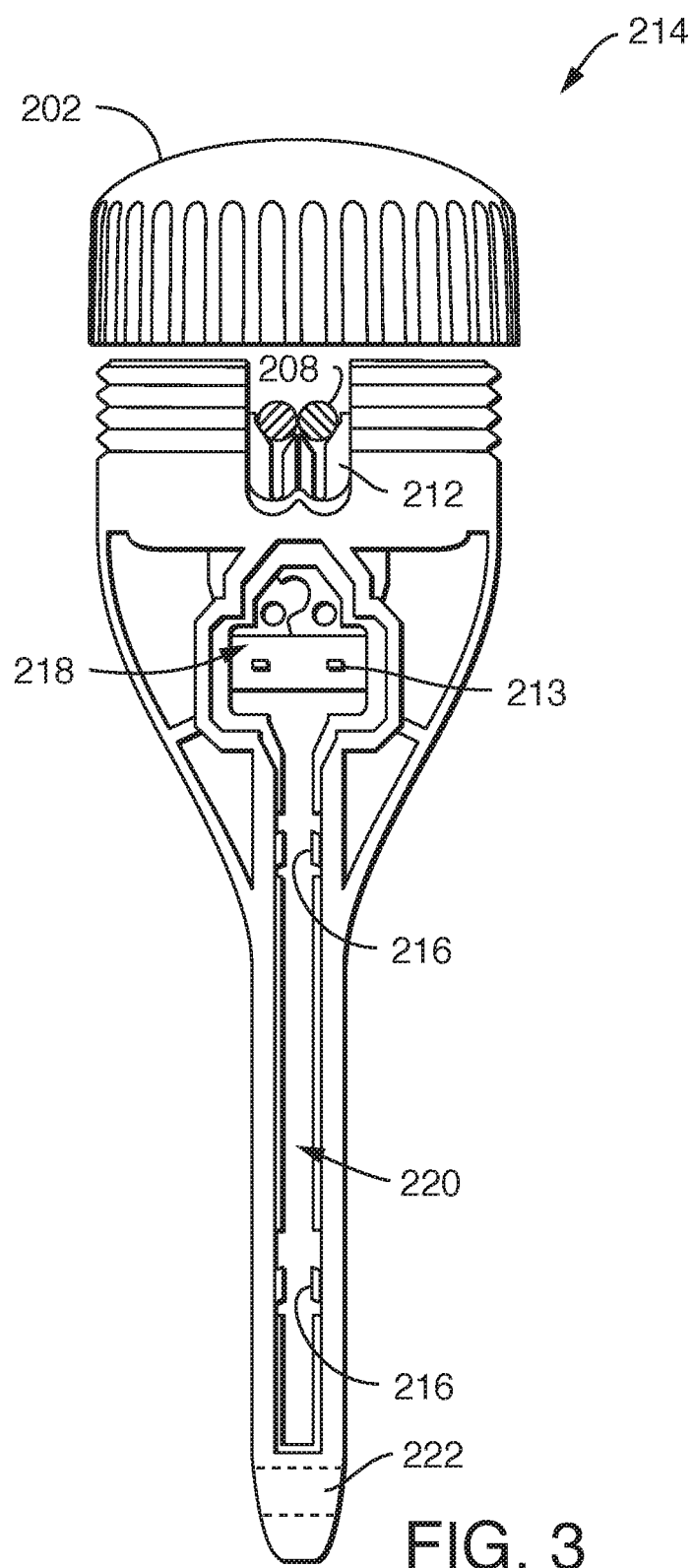
FIG. 3 is a front elevational view of mounting regions of endcap 214.

Referring to FIGS. 3-4, endcap 214 has a slot 220 to receive a lateral peripheral edge 41, 43 of lightguide 40. Slot 220 acts as a socket, and is form-fitted to a thickness (typically 3-5 mm) of body of lightguide 40. Slot 220 can form a friction fit or snap fit to lightguide 40, for example with snap-fit studs 216. At an upper region of endcap 214 there is a socket 218 which is formed and shaped to make a press-fit or friction fit to outer surfaces of housing 6, such as channel-shaped heat sink 6. Endcap 214 advantageously acts as a clamp to hold lightguide 40 and housing 6 better together. This can be helpful since luminaire 100 can have a long overall length of 50 inches (1.25 m), which makes it easy in greenhouses to have longitudinal groups of eight luminaires 100 that occupy a 10 meter run, for better volumetric planning. Endcap 214 thus tends to counteract a potential tendency of lightguide 40, under its own weight, to slip relative to housing 6.

Figure 15:
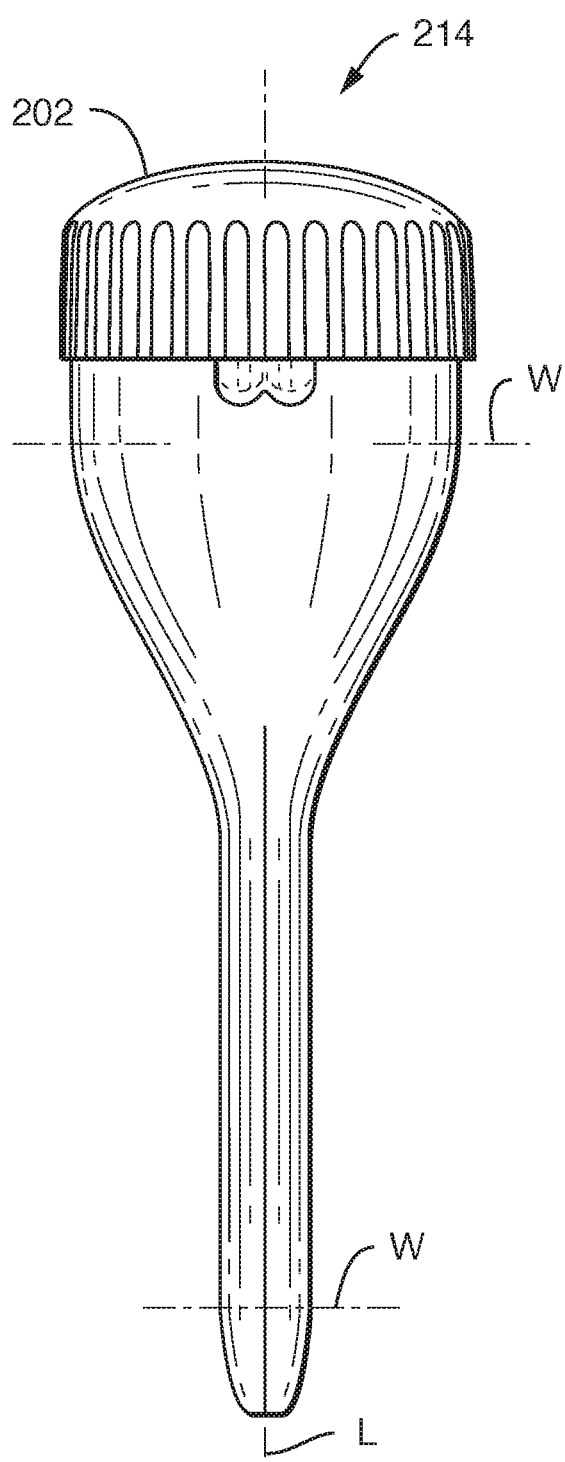
FIG. 15 is a rear elevational view of endcap 214.
Figures 16, 17:
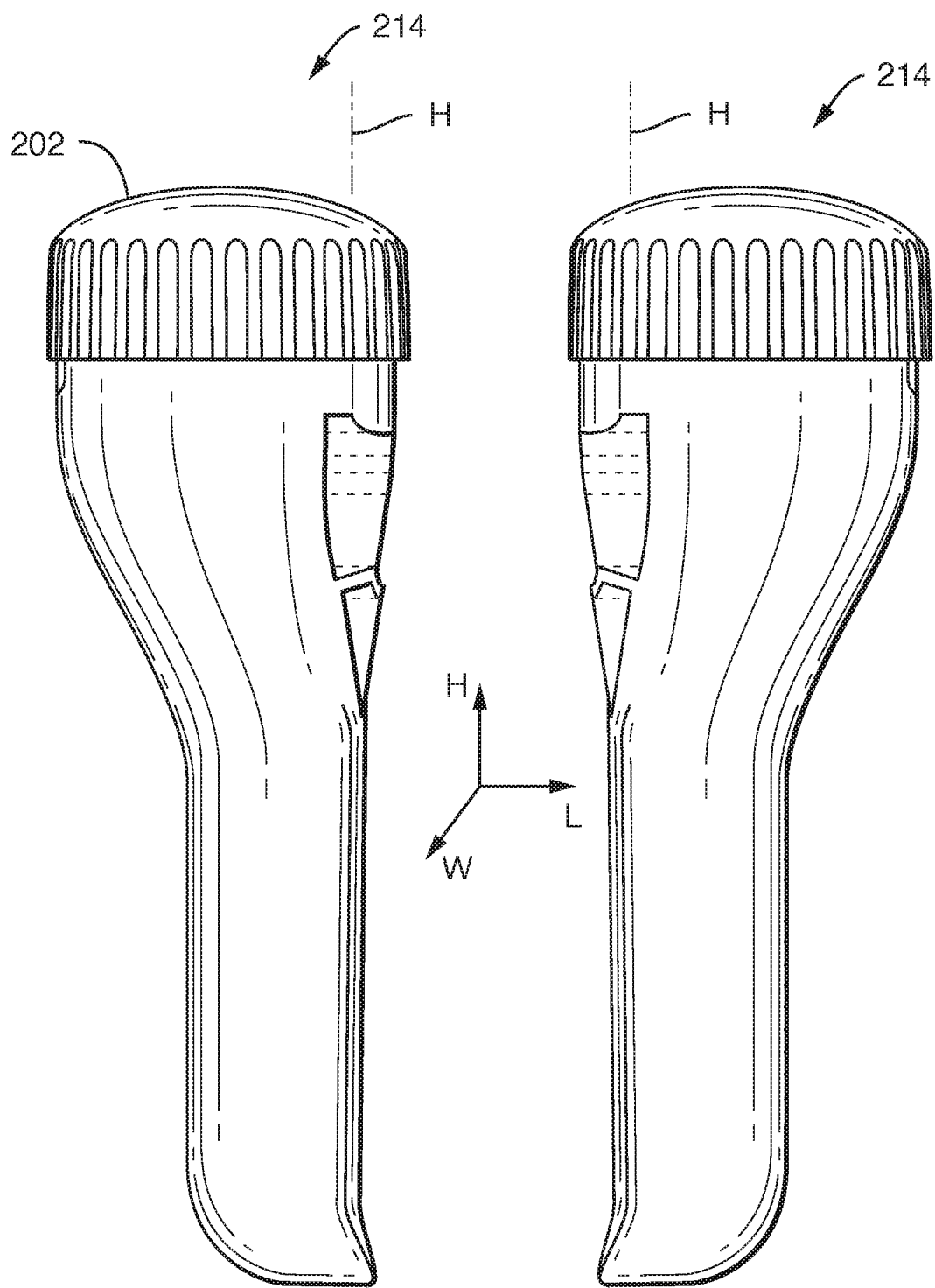
FIG. 16 is a right side elevational view of endcap 214.
FIG. 17 is a left side elevational view of endcap 214.
Figure 18:
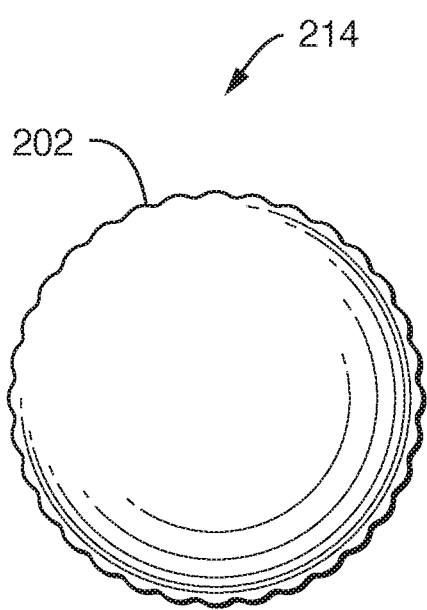
FIG. 18 is a top plan view of endcap 214.
Figure 19:
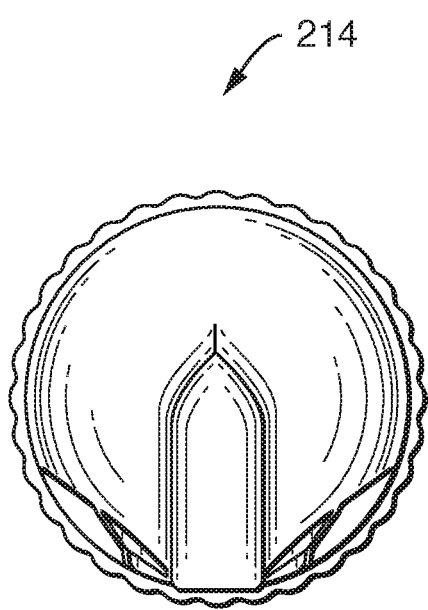
FIG. 19 is a bottom plan view of endcap 214.

Referring to FIG. 4 and FIGS. 11-19, it is seen that end cap 214 is outwardly convexly curved about an axis transverse to longitudinal axis L of lightguide 40. Endcap 214 can be outwardly convexly curved about one or more axis. FIGS. 16-17 and FIG. 19 show endcap 214 is outwardly convexly curved about a vertical H-axis of lightguide 40 representing a height direction of lightguide 40. FIGS. 15-17 also show endcap 214 is outwardly convexly curved about a width axis (W), where an outer contour of endcap 214 at an upper, bowl-shaped region below cap 202, is curved in a direction from top towards bottom. FIGS. 15-17 also show an outer contour of endcap 214 at a lower region near wire-support hole 222 is outwardly convexly curved like a heel, also about a width axis (W) of lightguide 40, protecting a lower lateral corner of lightguide edges 41, 43. Still further, endcap 214 may have upper cap 202 that is also outwardly convex curved; because cap 202 is approximately spherical, it is curved about the three axes.

Endcap 214 is molded of plastic, can be opaque, and is not a light-transmissive member and does not form the light output pattern.

Referring to FIGS. 1, 2, 4 and 25, Y-shaped hangers 400 can suspend luminaire 100 in a greenhouse or from a support beam using support cable or wire 402 such as aircraft cable. Luminaire 100 could also be mounted on a floor-standing pole.

Figure 25:
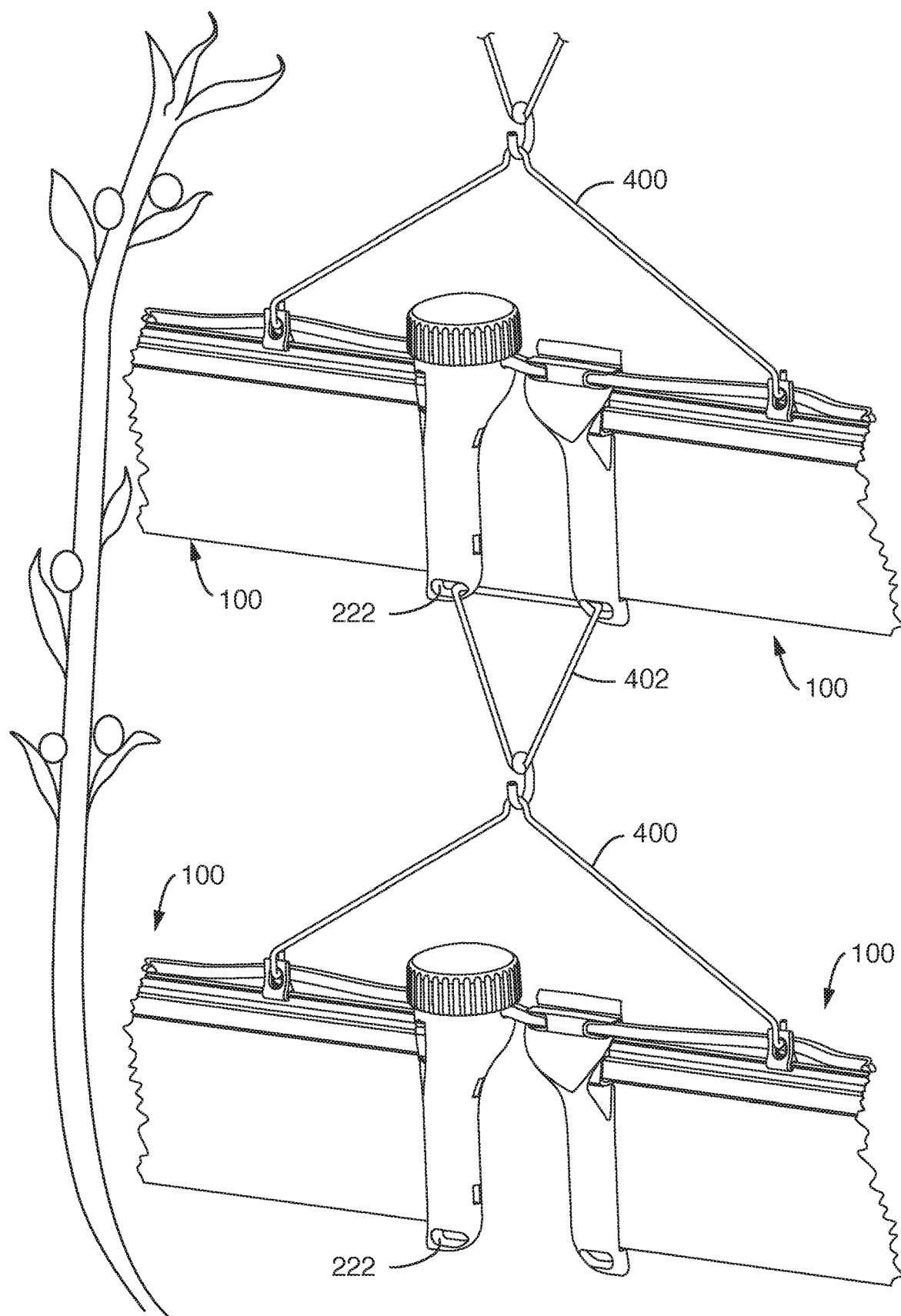
FIG. 25 shows multiple vertical rows of luminaires 100.

FIG. 25 shows two vertical rows of spaced luminaires 100 supported by brackets and wires off of apertures 222 in endcaps 214. Suitably, a two-foot (60 cm) spacing in vertical direction between rows of adjacent intracanopy luminaires is provided.

Figure 26:
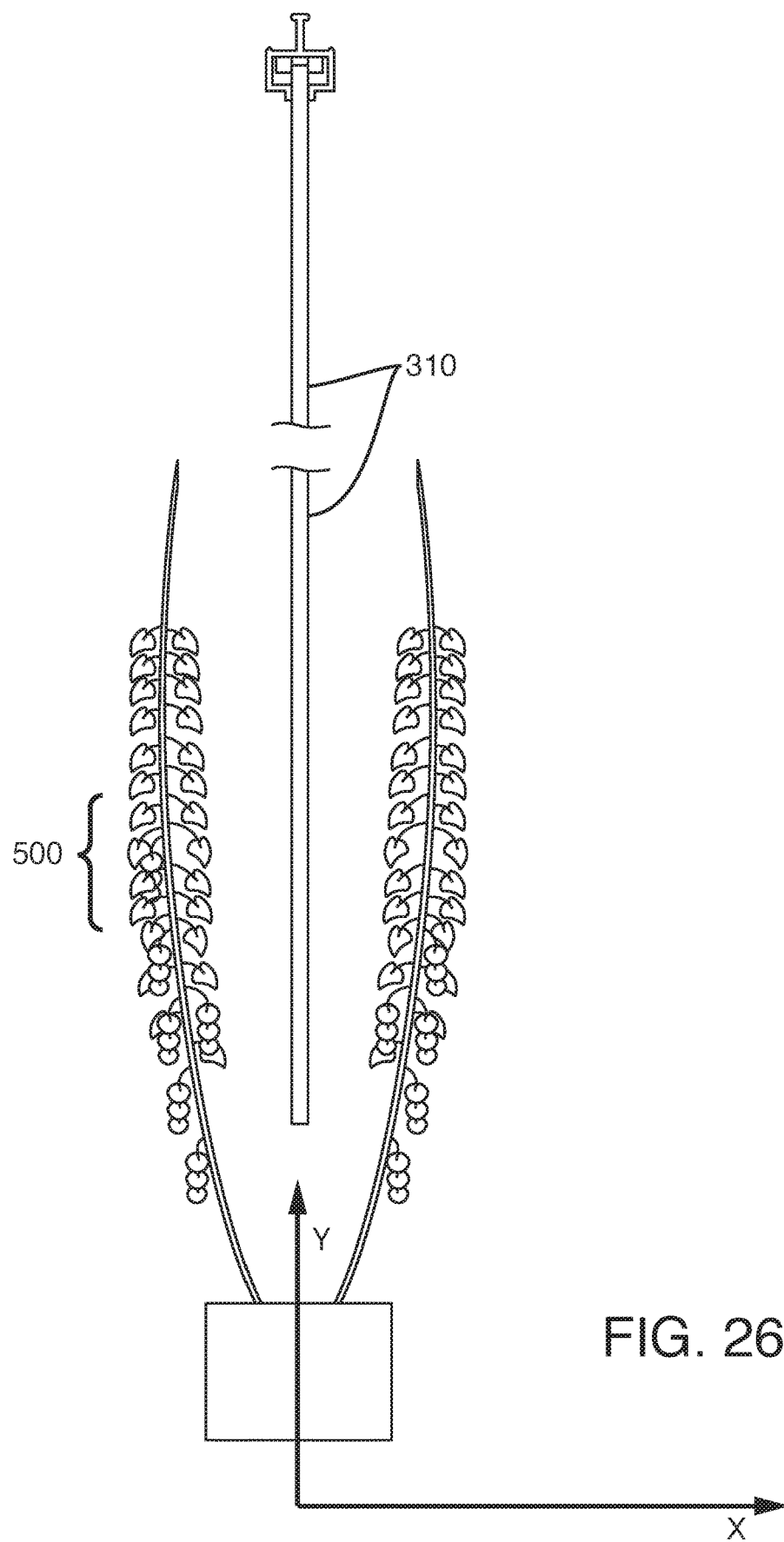
FIG. 26 shows alternate embodiment luminaire 100 with elongated lightguide 310.
Figure 27:
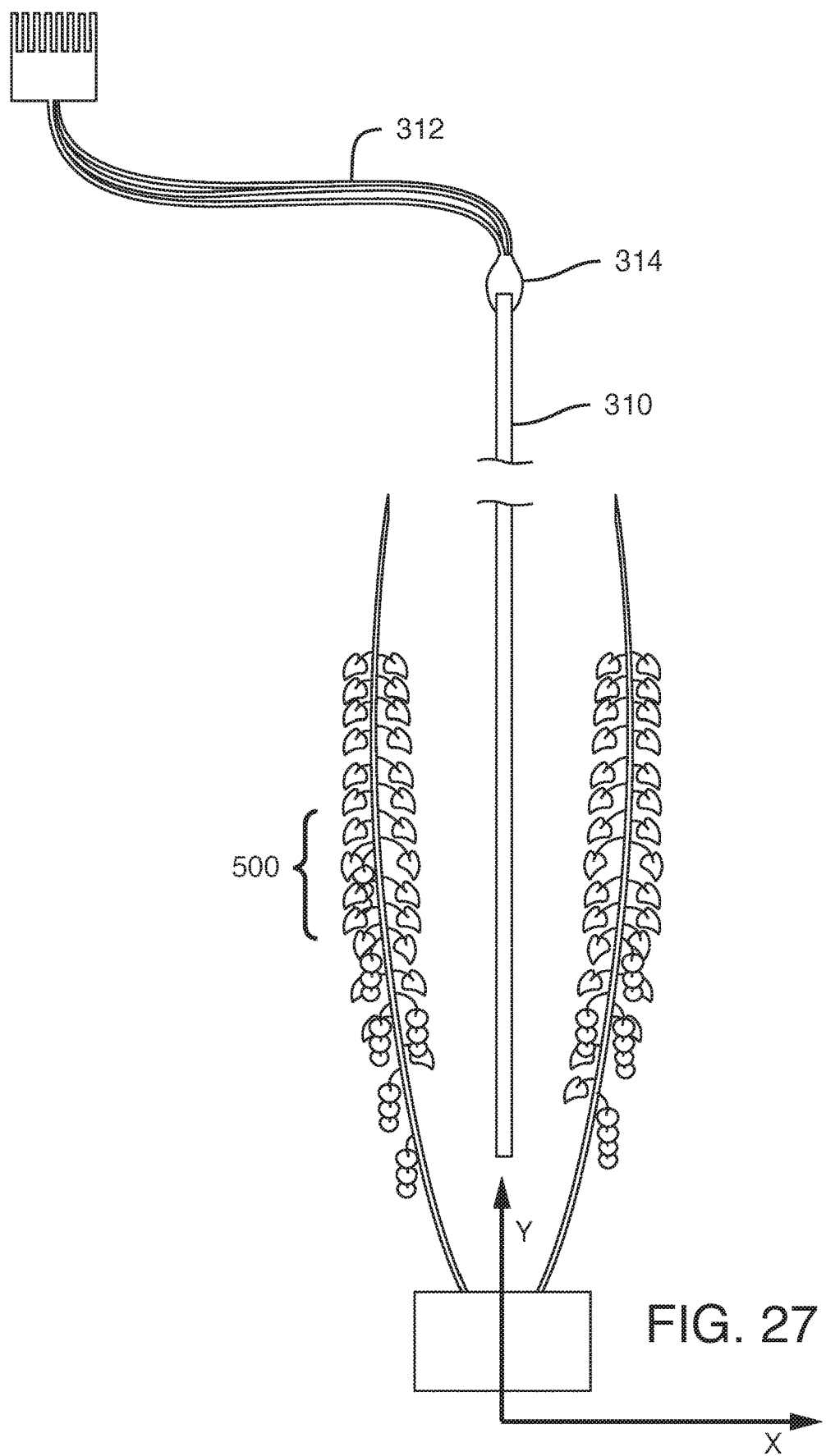
FIG. 27 shows alternate luminaire 100 with light fiber bundle source 312.

Referring to FIGS. 26-27, further alternate embodiments are shown for a modified luminaire 100, in which a light source is located outside of intracanopy space 500. In FIG. 26, an alternate luminaire 100 has a highly elongate lightguide 310 that extends from a region above a plant canopy to the intracanopy space 500. In FIG. 27 a solid-state light source injects light, in a known manner, into light fiber bundle 312 which via fiber optic coupler 314 injects light into elongate lightguide 310.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The following non-limiting reference numerals are used in the specification:
2 LED
4 printed circuit board substrate (MCPCB)
6 housing (channel)
8 heat fin
10 poke-home connectors
12 emission face of LED 2
14 light engine
16 power supply
40 lightguide
41 first lateral peripheral edge
42 first longitudinal edge (light input surface)

43 second lateral peripheral edge
44 first emission face
46 second emission face
48 distal free end
50 light directing film
52 reflector (or reflective tape)
61 supporting lip
62 reflective tape
100 intracanopy luminaire or light module assembly
110 batwing light distribution
202 upper cap
208 power cable
212 contact blade
213 electrical connectors
214 endcap
216 snap-fit stud
218 socket of channel-receiving region
220 slot of lightguide-receiving region
222 aperture in bottom of endcap 214
224 cable clip
300 midspan clip
302 tabs on clip 300
310 elongate lightguide
312 light fiber bundle
314 light fiber coupler
400 Y-hanger
402 hanging wire or cable
500 intracanopy space
H height (or vertical) axis of lightguide
L longitudinal axis of luminaire
V vertical axis
X horizontal axis horizontal to ground, perpendicular to L

What is claimed is:

1. An intra-canopy horticultural luminaire (100) for illuminating a portion of a crop having a vertical height that is measurable along an axis that is substantially vertical to ground level, the horticultural luminaire comprising:
a solid-state light source (2) disposed on a substrate (4) and located within a housing (6);
a lightguide (40) having a first longitudinal edge (42) and a second longitudinal edge (48) positioned opposite the first longitudinal edge;
the lightguide having a longitudinal axis (L) extending along its major length dimension, the lightguide further having a width (W) in a lateral direction along a width axis (X) perpendicular to the longitudinal axis (L);
the lightguide defining at least one emission face (44; 46) extending between the first and second longitudinal edges, the at least one emission face extending away from the light source;
the lightguide being optically coupled to the light source at the first longitudinal edge, the lightguide receiving a portion of the light emitted from the light source and transmitting that light therethrough, the lightguide altering an angular path of the transmitted light along a forward direction (V);
wherein the lightguide has a light output that includes the transmitted light from the light source;
wherein the at least one emission face of the lightguide comprises optical extractors disposed, along a vertical height in the forward direction (V), from a region proximal the first longitudinal edge (42) and extending toward a region proximal the second longitudinal edge (48), such that the light output of the lightguide is output over a majority portion of the vertical height of the at least one emission face, and the light output of the lightguide has two downwardly directed angular peaks on opposite sides of the vertical direction (V), has a value below the peak values along the vertical direction (V), and has decreasing values at angles above the angular peaks; and
wherein the angular peaks are at about plus 30 degrees and at about minus 30 degrees away from the vertical direction (V).

2. The horticultural luminaire of claim 1, wherein the decreasing values of the light output at angles above the angular peaks falls off monotonically.

3. The horticultural luminaire of claim 1, wherein the light output has a batwing distribution pattern.

4. The horticultural luminaire of claim 1, wherein in a cross-section taken perpendicular to the longitudinal axis the lightguide is planar.

5. The horticultural luminaire of claim 1, wherein the lightguide has a planar incident face (42) facing the light source.

6. The horticultural luminaire of claim 1, wherein the lightguide does not alter the angular path of the transmitted light along the longitudinal direction (L) of the luminaire.

7. The horticultural luminaire of claim 1, wherein the light output is devoid of appreciable side peaks.

8. The horticultural luminaire of claim 1, wherein the light output has no more than a negligible component directed along the longitudinal direction (L).

9. The horticultural luminaire of claim 1, wherein the light output is symmetric about both sides of the lightguide.

10. The horticultural luminaire of claim 1, wherein the lightguide has a vertical height not exceeding about 3 inches (75 mm) extending from the housing.

11. The horticultural luminaire of claim 1, wherein the lightguide has a thickness not exceeding about 3 mm.

12. The horticultural luminaire of claim 1, wherein the lightguide has a vertical height of about 3 inches (75 mm) extending from the housing.

13. The horticultural luminaire of claim 1, wherein the lightguide has a thickness of about 3 mm.

14. The horticultural luminaire of claim 1, wherein the lightguide has a vertical height of about 3 inches (75 mm) extending from the housing and a thickness of about 3 mm.

15. The horticultural luminaire of claim 1, wherein the lightguide has a vertical height, extending from the housing, between about 1.5 inch (38 mm) to about 7 inches (178 mm).

16. The horticultural luminaire of claim 1, wherein the peaks exhibit a Full Width Half Maximum (FWHM) of about 55 degrees.

17. The horticultural luminaire of claim 1, wherein a light output intensity at a valley exhibiting lowest intensity between the peaks is less than one-seventh a peak intensity.

18. The horticultural luminaire of claim 1, wherein the lightguide is rigid.

19. The horticultural luminaire of claim 1, wherein the optical extractors are disposed along the entire vertical height of the at least one emission face.

20. The horticultural luminaire of claim 1, wherein the optical extractors are disposed along an entire vertical distance between the first and second longitudinal edges (42, 48).

21. The horticultural luminaire of claim 1, wherein a light output intensity at a valley exhibiting lowest intensity between the peaks is less than one-seventh a peak intensity, said valley being at regions below 90 degrees from the vertical.

22. The horticultural luminaire of claim 1, wherein a light output intensity at a valley exhibiting lowest intensity between the peaks is less than one-seventh a peak intensity, said valley being at regions below 90 degrees from the vertical.

* * * * *